(12) United States Patent
Dong et al.

(10) Patent No.: US 9,954,618 B1
(45) Date of Patent: Apr. 24, 2018

(54) OPTICAL DATA MODULATORS WITH FEEDBACK WAVELENGTH CONTROL

(71) Applicant: Alcatel-Lucent USA Inc., Murray Hill, NJ (US)

(72) Inventors: Po Dong, Morganville, NJ (US); Xi Chen, Aberdeen, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 15/462,256

(22) Filed: Mar. 17, 2017

Related U.S. Application Data

(60) Provisional application No. 62/468,361, filed on Mar. 7, 2017.

(51) Int. Cl.
*H04B 10/00* (2013.01)
*H04B 10/50* (2013.01)
*H04B 10/516* (2013.01)
*H04J 14/00* (2006.01)

(52) U.S. Cl.
CPC ......... *H04B 10/501* (2013.01); *H04B 10/516* (2013.01)

(58) Field of Classification Search
CPC .............. H04B 10/5057; H04B 10/572; H04B 10/07957
See application file for complete search history.

(56) References Cited

U.S. PATENT DOCUMENTS

2015/0160482 A1* 6/2015 Amberg ................ G02F 1/0147
385/1

2016/0028504 A1* 1/2016 Yaman ................ H04J 14/0221
398/34
2016/0377822 A1* 12/2016 Zheng ..................... H04J 14/02
385/14

OTHER PUBLICATIONS

Sang-Ngern, S. et al., "Electronic Feedback System for Stabilization of Fiber Ring Resonator", ETRI Journal, vol. 32, No. 1, Feb. 2010, pp. 53-61.
Li, H. et al., "A 25 Gb/s, 4.4 V-Swing, AC-Coupled Ring Modulator-Based WDM Transmitter with Wavelength Stabilization in 65 nm CMOS", IEEE J. of Solid-State Circuits, vol. 50, No. 12, Dec. 2015, pp. 3145-3159.
Li, C. et al., "Silicon Photonic Transceiver Circuits With Microring Resonator Bias-Based Wavelength Stabilization in 65 nm CMOS", IEEE J. Solid-State Circuits, vol. 49, No. 6, Jun. 2014, pp. 1419-1436.
Padmaraju, K., et al "Integrated thermal stabilization of a microring modulator", Optics Express, vol. 21, No. 12, Jun. 2013, pp. 14342-14350.
Lin, S. et al., "Wavelength Locked High-speed Microring Modulator Using an Integrated Balanced Homodyne CMOS Control Circuit", Optical Fiber Communication Conference, OSA Technical Digest (online), Optical Society of America, 2016, paper Th3J.4, 3 pgs, Mar. 24, 2016.

(Continued)

*Primary Examiner* — Daniel Dobson
(74) *Attorney, Agent, or Firm* — John F. McCabe

(57) ABSTRACT

An apparatus includes an optical data modulator, an electrical tuner located to control an operating wavelength of the optical data modulator, a photo-sensitive diode or photo-sensitive transistor, and an electronic feedback controller. The photo-sensitive diode or photo-sensitive transistor is connected to receive light from an optical output of the optical data modulator and is configured to output an electrical signal representative of a measured intensity of said received light. The electronic feedback controller is connected to receive the electrical signal from the optical intensity detector and to operate said electrical tuner based on an alternating current component of said measured intensity.

22 Claims, 4 Drawing Sheets

(56) References Cited

OTHER PUBLICATIONS

Padmaraju, K. et al., "Thermal stabilization of a microring modulator using feedback control", Optics Express, vol. 20, No. 27, Nov. 2012, 27999-28008.

Padmaraju, K. et al., "Wavelength Locking and Thermally Stabilizing Microring Resonators Using Dithering Signals", J. of Lightwave Technology, vol. 32, No. 3, Feb. 1, 2014, pp. 505-512.

Zortman, W. A. et al., "Bit-Error-Rate Monitoring for Active Wavelength Control of Resonant Modulators", IEEE Micro, 33(1), (published by IEEE Computer Society) 2013, pp. 42-52, Oct. 22, 2012.

Xu, Q. et al., "Cascaded silicon micro-ring modulators for WDM optical interconnection", Optics Express, vol. 14, No. 20, Oct. 2006, pp. 9431-9436.

Dong, P. et al, "Ten-Channel Discrete Multi-Tone Modulation Using Silicon Microring Modulator Array", OFC 2016, Paper W4J.4, 3 pgs, Mar. 24, 2016.

Dong, P. et al., "Thermally tunable silicon racetrack resonators with ultralow tuning power", Optics Express, vol. 18, No. 19, Sep. 2010, pp. 20298-20304.

Zheng, X. et al., "A high-speed, tunable silicon photonic ring modulator integrated with ultra-efficient active wavelength control", Optics Express, vol. 22, No. 10, May 2014, pp. 12628-12633.

Melikyan, A. et al., "Tapless Locking of Silicon Ring Modulators for WDM Applications", OFC 2017, Paper Tu2H.6.pdf, 3 pgs, Mar. 23, 2017.

* cited by examiner ent application No. 62/468,361, filed Mar. 7, 2017, by Po Dong and Xi Chen.

BACKGROUND

Technical Field

The invention relates to optical data modulators and methods for using optical data modulators.

Related Art

This section introduces aspects that may be help to facilitate a better understanding of the inventions. Accordingly, the statements of this section are to be read in this light and are not to be understood as admissions about what is prior art or what is not prior art.

An optical transmitter uses an optical data modulator to modulate a digital data stream onto an optical carrier. A variety of optical components have been used as optical data modulators, e.g., Mach-Zehnder interferometers (MZIs) and optical resonators. Many such optical components data modulate an optical carrier by modulating an optical path length in the optical component. For that reason, such optical components are typically constructed for a specific optical carrier wavelength, and the performance of such optical components may be adversely affected by temperature fluctuations, which change optical path lengths. For this reason, many optical modulators include a controller that compensates for environmental temperature fluctuations.

Silicon photonics may offer low-power devices that solve the problem of a growing demand for bandwidth in optical interconnects and optical communications. One such low-power device, which may be fabricated using silicon photonics, is an optical loop resonator. An optical loop resonator can often be operated with a low drive voltage and can often be fabricated with small capacitances. These properties can reduce power consumption in the corresponding electrical drivers, i.e., compared to other optical structures, when the optical loop resonator is operated as an optical data modulator. Nevertheless, the performance of an optical loop resonator as an optical data modulator, may be adversely affected by temperature fluctuations. Thus, the output signal of an optical loop resonator may be monitored to control performance of the optical loop resonator in the presence of environmental temperature fluctuations, i.e., by wavelength-locking the optical loop resonator.

A cascade of optical loop resonators can be used to modulate multiple wavelength channels, e.g., to produce a data-modulated wavelength division multiplexed (WDM) optical signal. But, in such a cascade, the performance of the individual optical loop resonators would typically be affected by errors in fabrication and environmental temperature fluctuations.

SUMMARY OF SOME ILLUSTRATIVE EMBODIMENTS

An array of optical data modulators, e.g., loop optical resonators of MZIs, may need to be wavelength-locked, e.g., to compensate for the undesired effects of fabrication errors and/or environmental temperature fluctuations. Whereas such compensation may be achieved by a feedback control based on separate monitoring of the data-modulated optical signals from the individual optical data modulators, various embodiments provide other methods and apparatus for producing such compensation.

Rather than separately monitoring the light output by individual optical data modulators of an array, various embodiments are constructed to monitor data-modulated light from said optical data modulators after the light's combination. Said combined light typically includes modulated optical carriers in different wavelength channels, i.e., wavelength division multiplexed (WDM) light. In the various embodiments, the monitoring includes measuring the intensity of said combined or WDM light, and using one or more non-zero frequencies thereof for monitoring, alternating current (AC) component(s) of the measured intensity. From AC components of the measured intensity of the combined light, various embodiments can adjust operating properties of individual ones of the optical data modulators. Monitoring of the intensity of such combined light may be simpler and typically should require few optical devices than in some alternative multiple wavelength optical modulators that separately monitor the light intensities output by individual ones of the optical data modulators of the array.

In first embodiments, an apparatus includes an optical combiner, N optical data modulators, a plurality of electrical tuners, an optical intensity detector, and an electronic feedback controller. The optical combiner has N optical inputs and an optical output connected to combine light received at the N optical inputs. For example, the optical combiner may be an optical power combiner or a wavelength division multiplexer. Each of the optical data modulators is connected to transmit light to a corresponding one of the N optical inputs of the optical combiner. Each electrical tuner is located to set an operating wavelength of a different one of the optical data modulators. The optical intensity detector is connected to receive light from the optical output of the optical combiner and is configured to output an electrical signal representative of a measured intensity of said received light. The electronic feedback controller is connected to receive the electrical signal from the optical intensity detector and to operate said electrical tuners based on an alternating current component of said measured intensity.

In some embodiments of the above apparatus, the plurality of electrical tuners may include less than N of said electrical tuners, and each of the electrical tuners is located to control a corresponding one of the optical data modulators. In some alternate embodiments of the above apparatus, the plurality of electrical tuners includes N of said electrical tuners.

In some embodiments of any of the above apparatus, said electrical tuners may be resistive heaters, and each such resistive heater may be located to heat an optical waveguide segment of a corresponding one of the optical data modulators. In some such embodiments, the electronic feedback controller may be configured to operate the resistive heaters such that each optical data modulator operates at a different carrier wavelength than the other optical data modulators.

In some embodiments of any of the above apparatus, each optical data modulator may be an optical resonator, and the electronic feedback controller may be configured to feedback operate the electrical tuners such that a magnitude of the alternating current component of the measured optical intensity is maintained at a relatively high level. In alternate embodiments of any of the above apparatus, the electronic feedback controller may be configured to feedback control the optical modulators such that a magnitude of the alternating current component of the measured optical intensity is maintained at a relatively low level.

In some embodiments of any of the above apparatus, the feedback controller may be configured to cause the N optical data modulators to phase shift key modulate optical carriers at N different optical wavelengths.

In some embodiments of any of the above apparatus, the electronic feedback controller may be configured to average said electrical signal over periods at least 100, 1000, 10000, 100000, or 1000000 times longer than an optical data symbol period of the optical data modulators.

In some embodiments of any of the above apparatus, each optical intensity detector may be a photo-sensitive diode or a photo-sensitive transistor.

In second embodiments, a method includes measuring an intensity of an output optical signal combining data modulated optical signals produced by N optical data modulators and feedback adjusting operating wavelengths of the optical data modulators based on an alternating current component of said measured intensity. Each of the data modulated optical carriers has a different center wavelength. The feedback adjusting involves either adjusting each of the N optical data modulators in a manner that tends to decrease a magnitude of an alternating current component of the measured intensity of the combined optical signal or adjusting each of the N optical data modulators in a manner that tends to increase the magnitude of the alternating current component of the measured intensity of the combined optical signal.

In some embodiments of the above method, the feedback adjusting may involve adjusting an optical waveguide segment of each of the optical data modulators in a manner that tends to decrease the magnitude of the alternating current component and causes the optical data modulators to operate as optical phase shift keying modulators. In some such embodiments, the optical data modulators may be Mach-Zehnder interferometers and the feedback adjusting may cause said Mach-Zehnder interferometers to modulate different optical wavelengths to carry data in a phase shift keying format.

In some embodiments of the above method, the feedback adjusting may involve adjusting an optical waveguide segment of each of the N optical modulators in a manner that tends to increase the magnitude of the alternating current component and causes the N optical modulators to operate as optical amplitude modulators at different optical wavelengths. In some such embodiments, the optical data modulators may be resonant optical cavities, and the feedback adjusting may cause said resonant optical cavities to modulate the different optical wavelengths to carry data in an amplitude keying format.

In any embodiments of the above method, the feedback adjusting may include time-averaging said measured intensity over a period at least 100, 1000, 10000, 100000, or 1000000 times longer than an optical data symbol period of the optical data modulators.

Some embodiments include an optical data modulator for a single optical wavelength channel, wherein the AC component of the data-modulated optical signal is used to feedback control the operating wavelength of the optical data modulator. In such a feedback control, the operating wavelength may be controlled in a manner that sets the optical data modulator to perform better. For example, in some examples of optical amplitude modulators, such feedback control of an optical data modulator may produce a data-modulated optical carrier with a larger intensity difference between ON and OFF states than in optical data modulators that are not feedback controlled based on the AC component of the intensity of the data-modulated optical signal.

In third embodiments, an apparatus includes an optical data modulator, an electrical tuner located to control an operating wavelength of the optical data modulator, a photo-sensitive diode or photo-sensitive transistor, and an electronic feedback controller. The photo-sensitive diode or photo-sensitive transistor is connected to receive light from an optical output of the optical data modulator and is configured to output an electrical signal representative of a measured intensity of said received light. The electronic feedback controller is connected to receive the electrical signal from the optical intensity detector and to operate said electrical tuner based on an alternating current component of said measured intensity.

In some of the third embodiments, the apparatus may be such that said electrical tuner is a resistive heater located to heat an optical waveguide segment of the optical data modulator.

In some of the third embodiments, the apparatus may be such that the electronic feedback controller is configured to produce the alternating current component by filtering the received electrical signal to remove low frequency and direct current portions therein. In some examples, the optical data modulator may be an optical resonator and the electronic feedback controller may be configured to feedback operate the electrical tuner such that a magnitude of the alternating current component of the measured optical intensity is maintained at a relatively high level. In other examples, the electronic feedback controller may be configured to feedback control the optical data modulator such that a magnitude of the alternating current component of the measured optical intensity is maintained at a relatively low level such that the optical data modulator is operated as an optical phase modulator.

In any of the third embodiments, the apparatus may be such that the electronic feedback controller is configured to average said electrical signal over periods at least 100 times longer than an optical data symbol period for the optical data modulator.

In the Figures, relative dimension(s) of some feature(s) may be exaggerated to more clearly illustrate the feature(s) and/or relation(s) to other feature(s) therein.

In the various Figures, similar reference numbers may be used to indicate similar structures and/or structures with similar functions.

Herein, various embodiments are described more fully by the Figures and the Detailed Description of Illustrative Embodiments. Nevertheless, the inventions may be embodied in various forms and are not limited to the embodiments described in the Figures and the Detailed Description of Illustrative Embodiments.

DETAILED DESCRIPTION OF ILLUSTRATIVE EMBODIMENTS

Figure 1:
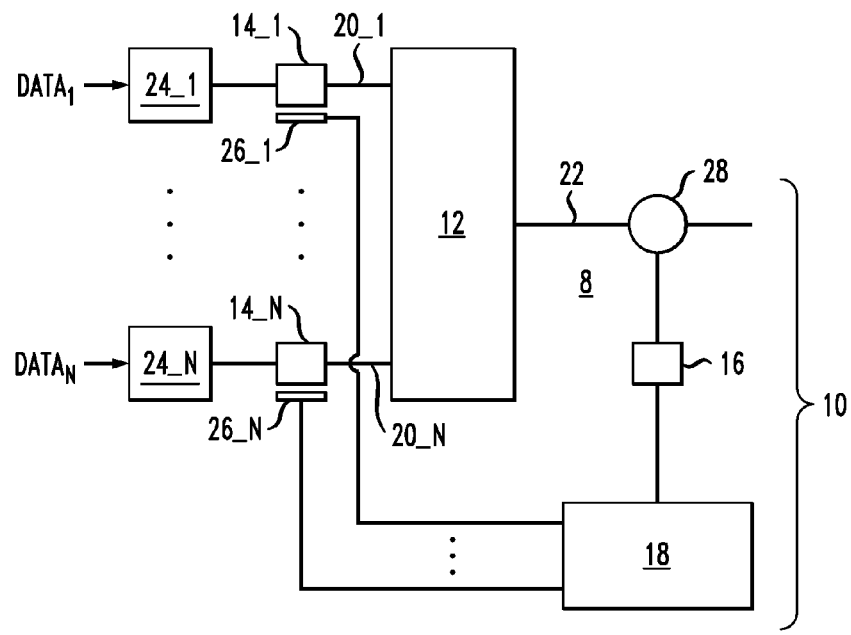
FIG. 1 is a block diagram schematically illustrating an array of optical data modulators.

FIG. 1 schematically illustrates an array device 10 that includes N optical data modulators 14_1, . . . 14_N, and is able to produce, in parallel, N data-modulated optical carriers, e.g., at different optical carrier wavelengths. The array device 10 includes an N×1 optical combiner 12; the N optical data modulators 14_1, . . . 14_N; an optical intensity detector 16; and an electronic feedback controller 18. Here, N is an integer that is greater than 1, e.g., N may be 2, 3, 4, 5, 6, 7, 8, etc.

The optical combiner 12 has N optical inputs 20_1, . . . 20_N and an optical output 22. The optical combiner 12 transmits to the optical output 22 a combination of the light received at the N optical inputs 20_1, . . . 20_N. The optical combiner 12 may be made from any conventional M×1 optical power combiner or conventional M×1 wavelength division multiplexer where M is an integer that is greater than or equal to N.

Each optical modulator 14_1, . . . 14_N is configured to receive an optical carrier and to data modulate the optical carrier if the optical carrier has light of an appropriate wavelength. The individual optical modulators 14_1, . . . 14_N are configurable to operate at different optical carrier wavelengths. The individual optical data modulators 14_1, . . . 14_N may be, e.g., conventional resonant optical modulators, such as optical loop resonators or photonic crystal-based resonators, or may be, e.g., conventional modulatable Mach-Zehnder interferometers (MZIs).

Each optical data modulator 14_1, . . . 14_N is connected to be operated by a corresponding electronic driver 24_1, . . . 24_N. Some or all of the N optical data modulators 14_1, . . . 14_N are configured to be wavelength-tuned by corresponding electrical tuners 26_1, . . . 26_N.

The N electronic drivers 24_1, . . . 24_N are configured operate the N optical modulators 14_1, . . . 14_N, e.g., to modulate N corresponding digital data streams DATA_1, . . . , DATA_N onto optical carriers, e.g., at different wavelengths when locked by the electronic controller 18. The N digital data streams DATA_1, . . . DATA_N may be modulated, in an amplitude modulated format, onto the optical carrier wavelengths, or the N digital data streams DATA_1, . . . DATA_N may be modulated, in a phase modulated format, onto the optical carriers, i.e., by the N optical data modulators 14_1, . . . 14_N. For amplitude modulation, the format may be, e.g., ON/OFF keying, pulse amplitude modulation N (PAM N), discrete multi-tone modulation (DMT), or carrier-less amplitude phase modulation, and for phase modulation the format may be, e.g., binary phase shift keying (BPSK). Here, N may be 2, 4, 8, 16, etc.

The electrical tuners 26_1, . . . 26_N are configured to provide substantially separate control of one or more operating characteristic(s) of corresponding ones of the optical data modulators 14_1, . . . 14_N. This control of the operating characteristic(s) enables substantial individual adjustment of the operating wavelengths of the corresponding optical data modulators 14_1, . . . 14_N and individual locking of said operating wavelengths.

Each electrical tuner 26_1, . . . 26_N may be located and configured to provide for the substantially separate adjustment of an optical path length in the corresponding optical modulator 14_1, . . . 14_N. For example, in various embodiments, each electrical tuner 26_1, . . . 26_N may include an electrical heater located to resistively heat an optical waveguide segment of an optical loop resonator or an optical waveguide segment of one optical arm of an MZI of a corresponding optical modulator 14_1, . . . 14_N. Alternatively, the electrical tuner 26_1, . . . 26_N may include electrode(s) located to apply a voltage bias across a semiconductor junction in such an optical waveguide segment. In various embodiments, the electrical tuners 26_1, . . . 26_N may be operated to dynamically stabilize or lock some or all of the N operating wavelengths of the N optical modulators 14_1, . . . 14_N and/or may be operated to initially set some or all of said N operating wavelengths.

The optical intensity detector 16 is connected to receive light from the optical output 22 of the optical combiner 12 and to output an electrical signal that is a time-dependent analog or digital measurement of the intensity of said received light. The optical intensity detector 16 may be, e.g., a photo-sensitive diode or a photo-sensitive transistor connected to the optical output 22 via any conventional 1×2 optical coupler 28. The 1×2 optical coupler 28 may be, e.g., an optical tap coupler or another conventional optical power splitter, e.g., an asymmetrical optical power splitter.

The electronic feedback controller 18 is connected to receive the electrical signal from the optical intensity detector 16 and to control the operating wavelengths of some or all the N optical data modulators 14_1, . . . 14_N based on an alternating current (AC) component of said received electrical signal. The electronic feedback controller 18 typically processes the received electrical signal to remove the direct current component therein, e.g., via high pass or bandpass filtering. That is, the processing removes component(s) of the electrical signal measuring low frequency or time-independent portions of the measured intensity. The electronic feedback controller 18 uses alternating current (AC) components of the received electrical, e.g., radio frequency (RF) components, to feedback control some or all the N optical data modulators 14_1, . . . 14_N. Thus, the electronic feedback controller 18 feedback controls some or all the N optical data modulators 14_1, . . . 14_N based on monitoring of the alternating current (AC) component of combined optical signal output by the array device 10, e.g., monitoring one or more radio or lower AC frequency components thereof. Such feedback control may be used to initialize and/or lock the operating wavelengths of some or all the N optical modulators 14_1, . . . 14_N.

The electronic feedback controller 18 may process the electrical signal, received from the optical intensity detector 16, in a manner that averages over times much longer than the optical data symbol period of the N optical data modulators 14_1, . . . 14_N. While the optical data symbol period may be $10^{-9}$ seconds or less or even $10^{-10}$ seconds or less, significant undesired variations of physical optical properties of the N optical data modulators 14_1, . . . 14_N typically occur over much longer periods, e.g., $10^{-4}$ seconds or longer or even $10^{-3}$ seconds or longer. For that reason, the electronic feedback controller 18 may average the electrical signal from the optical intensity detector 16 over a period, e.g., more than 10 times the optical data symbol period, more than 100 times the optical data symbol period, more than 1000 times the optical data symbol period, more than 10,000 times the optical data symbol period, more than 100,000 times the optical data symbol period or even more than 1,000,000 times the optical symbol period and still be able to efficiently lock operating wavelengths of N some or all of the N optical data modulators 14_1, . . . 14_N.

When averaged over such a long time as compared to the optical data symbol period, the AC component of the electrical signal does not include significant contributions from crossterms between the data modulated optical carriers of different ones of the optical modulators 14_1, . . . 14_N. Thus, the time-averaged AC component of the electrical signal is a sum of time-averaged AC optical powers output by the individual optical data modulators 14_1, . . . 14_N of the array device 10. Such a result follows provided that the different optical modulators 14_1, . . . 14_N output data-modulated optical carriers on non-overlapping optical wavelength channels and said optical carriers are data-modulated with independent data streams.

Thus, after suitable time-averaging, the AC component of the electrical signal output by the optical intensity detector 16, is a sum of time-averaged AC components of the output optical powers of the N individual optical data modulators 14_1, . . . 14_N as would be, separately detected in the optical intensity detector 16. Since the output optical power of each optical data modulator 14_1, . . . 14_N is non-negative, the time-averaged AC component of the output optical power of each individual optical data modulator 14_1, . . . 14_N may be maximized by maximizing the AC component of the total optical power, as measured by the optical intensity detector 16 and possibly time-averaged by the electronic feedback controller 18. Similarly, the time-averaged AC component of the output optical power of each of the N individual optical data modulators 14_1, . . . 14_N may be minimized by minimizing the AC component of the total or combined output optical power, as measured by the optical intensity detector 16 and time-averaged by the electronic feedback controller 18. For these reasons, the electronic feedback controller 18 may adjust the operating wavelengths of the N electrical tuners 26_1, . . . 26_N, approximately individually, based on an approximate optimization of such a time-averaged AC component of the total optical output power as measured by the optical intensity detector 16.

In some embodiments, the N×1 optical combiner 12, N optical data modulators 14_1-14_N, the optical intensity detector 16, and part or all of the electronic feedback controller 18 may be integrated onto a planar substrate, e.g., a silicon or group III-V semiconductor substrate. That is, the array device 10 of FIG. 1 may be fabricated, by conventional processing methods, based on the disclosure herein, as an integrated opto-electronic device.

Figure 2:
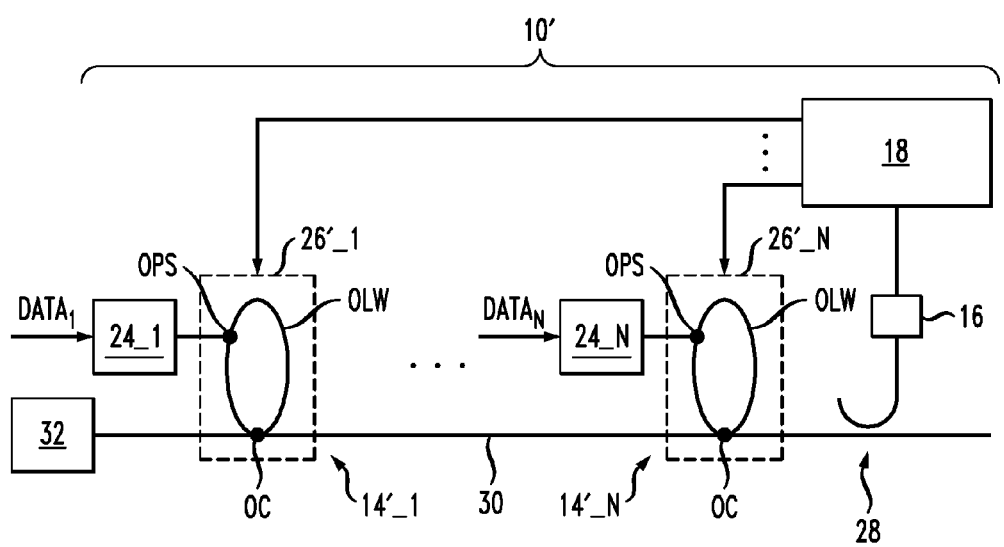
FIG. 2 is a block diagram schematically illustrating an embodiment of the array of optical data modulators of FIG. 1 that is based on optical loop resonators.

FIG. 2 schematically illustrates an array device 10', which is based on N optical loop resonators 14'_1, . . . 14'_N; a corresponding N electrical tuners 26'_1, . . . 26'_N; and an optical bus waveguide 30. The array device 10' also includes the N electronic drivers 24_1, . . . 24_N, the electronic feedback controller 18, the optical intensity detector 16, and the 1×2 optical coupler 28 as already discussed with respect to FIG. 1.

The optical bus waveguide 30 acts as a bus for multiple wavelengths of light received, at an input end thereof, from an optical source 32. The optical bus waveguide 30 outputs light, at an output end thereof, which is data modulated by the optical loop resonator(s) 14'_1, . . . 14'_N. At the input end, the optical source 32 may transmit a comb of N optical wavelengths, i.e., wavelength-multiplexed optical carriers. For example, the optical source 32 may include a conventional N×1 optical combiner and N lasers that transmit, e.g., continuous wave light at the different optical wavelengths of the comb. The comb may have, e.g., the N optical carrier wavelengths on a uniform grid. At the output end, the optical waveguide delivers the comb of optical carrier wavelengths as data-modulated by one or more of the N optical loop resonators 14'_1, . . . 14'_N. For example, the N optical loop resonators 14'_1, . . . 14'_N may amplitude modulate N or less optical wavelengths of the comb to carry N or less independent digital data streams, e.g., $DATA_1, \ldots DATA_N$.

Each optical loop resonator 14'_1, . . . 14'_N includes an optical loop waveguide (OLW), an optical coupler OC, and a drivable optical phase shifter (OPS). Each optical loop waveguide OLW and corresponding optical coupler OC form an optical waveguide resonant cavity. The optical coupler OC optically connects the optical loop waveguide OLW to optical bus waveguide 30, e.g., for wavelengths close to resonances of the corresponding optical waveguide cavity. Each optical phase shifter OPS is electrically controlled by a corresponding one of the N electronic drivers 24_1, . . . 24_N so that the optical phase shifter OPS can modulate the optical path length and resonant wavelength of the corresponding optical loop resonator 14'_1, . . . 14'_N. As an example, an optical phase shifter OPS may have a pair of voltage bias electrodes and PN- or PIN-semiconductor junction there between, wherein the junction extends along a controllable optical waveguide segment of the corresponding optical loop waveguide OLW. By modulation of the voltage bias across such a PN-semiconductor junction, the corresponding electronic driver 24_1, . . . 24_N can cause rapid modulation of the optical path length of the corresponding optical loop waveguide OLW.

An individual optical loop resonator 14'_1, . . . 14'_N optical couples to the optical bus waveguide 30 at a resonant optical wavelength of the individual optical loop resonator 14'_1, . . . 14'_N. At the resonant wavelength, the individual optical loop resonator 14'_1, . . . 14'_N can amplitude modulate light in the optical bus waveguide 30. For such an optical loop resonator 14'_1, . . . 14'_N, the resonant wavelength is adjustable by the corresponding electrical tuner 26'_1, . . . 26'_N. The individual electrical tuners 26'_1, . . . 26'_N may be, e.g., resistive heaters located adjacent segments of the corresponding optical loop waveguides OLW. Such resisting heaters may be, e.g., located on a top or bottom optical cladding along said segments of the optical loop waveguides OLW.

The collection of N optical couplers OC of the N optical loop resonators 14'_1, . . . 14'_N and the optical waveguide 30 form an embodiment of the N×1 optical combiner 12 of FIG. 1.

Typically, a suitably time-averaged AC component of the electrical signal from the optical intensity detector 16 is small or vanishing when the N optical loop resonators 14'_1, . . . 14'_N are configured as off-resonance at the optical carrier wavelengths of the comb from optical source 32. Away from the optical resonance wavelengths, the optical loop resonators 14'_1, . . . 14'_N are optically decoupled from the optical bus waveguide 30. Thus, the AC component of the total optical power, at the output end of the optical bus waveguide 30, will be minimal in such a situation, i.e., will not be data-modulated. On the contrary, the AC component of the electrical signal from the optical intensity detector 16 is large or maximal when the N optical loop resonators 14'_1, . . . 14'_N are configured the have their optical resonances at the optical carrier wavelengths of the comb. The amplitude modulation of the light of the optical bus waveguide 30 is expected to be approximately optimal when the total or combined output optical power has ether a large or maximal AC or RF component. At or near the maximum of the combined output optical power, it is expected that the N optical loop resonators 14'_1, ... 14'_N are approximately optimally modulating corresponding carrier wavelengths therein. For such an operating condition, it is expected that the N optical loop resonators 14'_1, ... 14'_N will produce amplitude modulated optical carriers with larger modulation depths. By maximizing the AC or RF component of the total or combined output optical power, e.g., rather than the DC component thereof, the electronic feedback controller 18 can simultaneous wavelength-lock the N optical loop resonators 14'_1, ... 14'_N to suitable operating points provided that each optical loop resonator 14'_1, ... 14'_N is locked to a different operating wavelength and applies an independent data stream to an optical carrier at said operating wavelength.

The above-described wavelength locking mechanism has multiple advantages. First, the approximately maximal AC or RF combined output optical power corresponds approximately to the largest depth of optical amplitude modulation for the individual data-modulated optical wavelength channels. Second, since the optical power detector 16 provides a monitoring signal rather than a fully data decodable signal, there is typically not a need to measure the full AC or RF combined output optical power, e.g., the optical power detector 16 does not need a high bandwidth. Third, there is typically no need for additional dither signals at the electrical tuners 26'_1, ... 26'_N for such monitoring. Fourth, such monitoring of the single total or combined output optical power enables wavelength locking of multiple optical loop resonators 14'_1, ... 14'_N due to the incoherent summation of the AC or RF optical powers of the different optical wavelength channels. Using such a single AC or RF monitoring signal may simplify wavelength locking of the array device 10'. Finally, the optical power detector 16 can be fabricated in CMOS circuitry using simple and low power components such as rectifiers.

Figure 3:
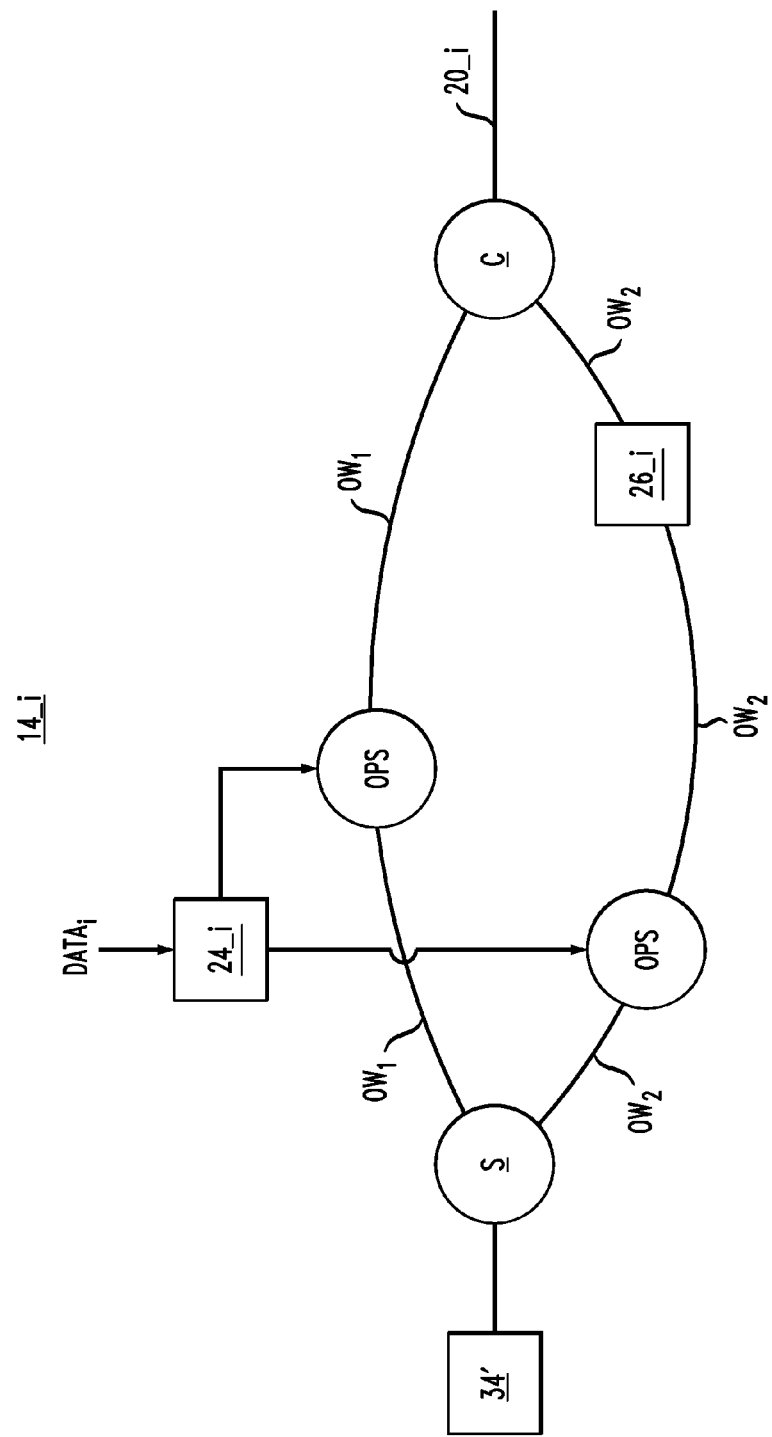
FIG. 3 is a block diagram schematically illustrating a Mach-Zehnder interferometer that may be used in an alternate embodiment of the array of optical data modulators of FIG. 1.

FIG. 3 schematically illustrates the i-th one of the optical data modulators 14_1, ... 14_N, in an embodiment of the array device 10 of FIG. 1, in which the N individual optical data modulators are Mach-Zehnder interferometers (MZIs). The MZI 14_i includes a 1×2 optical power splitter S, a 2×1 optical power combiner C, and first and second optical waveguide arms OW1, OW2, which connect the two optical outputs of the 1×2 optical splitter S to two optical inputs of the 2×1 optical combiner C. One or both the optical waveguides OW1, OW2 includes a controllable optical phase shifter OPS. The illustrated MZI 14_i has an optical phase shifter OPS on each optical waveguide arm OW1, OW2 and is operable in push-pull mode for which drive voltages typically have opposite signs in the two optical phase shifters OPS. In alternate embodiments, the MZI 14_i may have an optical phase shifter OPS on only one of the optical waveguides OW1, OW2 (not shown). The one or more optical phase shifters OPS are voltage driven by the electronic driver 24_i.

The MZI 14_i also includes an electrical tuner 26_i located along a segment of the optical waveguide OW2. The electrical tuner 26_i is controlled by the electronic feedback controller 18 to appropriately configure the relative optical path difference between the two optical waveguides OW1, OW2. For example, the electronic feedback controller 18 may be configured to fix a relative optical path length difference between the two optical waveguides OW1, OW2 so that the optical carriers output therefrom have a relative phase difference of about π radians or about 0 radians when combined in the optical combiner C. In such a configuration, the MZI 14_i will output a binary phase shift keyed modulated (BPSK) optical carrier. For such a BPSK modulated optical carrier, the AC component of the output optical power would be approximately zero, i.e., because the data-modulated optical carrier would not have an appreciable amplitude modulation. Thus, if all of the N optical modulators 14_1, ... 14_N of the array device 10 of FIG. 1 are configured for such BPSK modulation, the electronic feedback controller 18 would be configured to control the N electrical tuners 26_N, 26_N, e.g., including the electrical tuner 26_i of FIG. 3, so that the AC component of the total or combined optical output power, as measured by the optical intensity detector 16 of FIG. 1, is small or vanishing. That is, wavelength locking of an array of such MZIs 14_i to produce approximately optimal BPSK optical modulation involves approximately minimizing the AC component of the total or combined output optical power.

Figure 4:
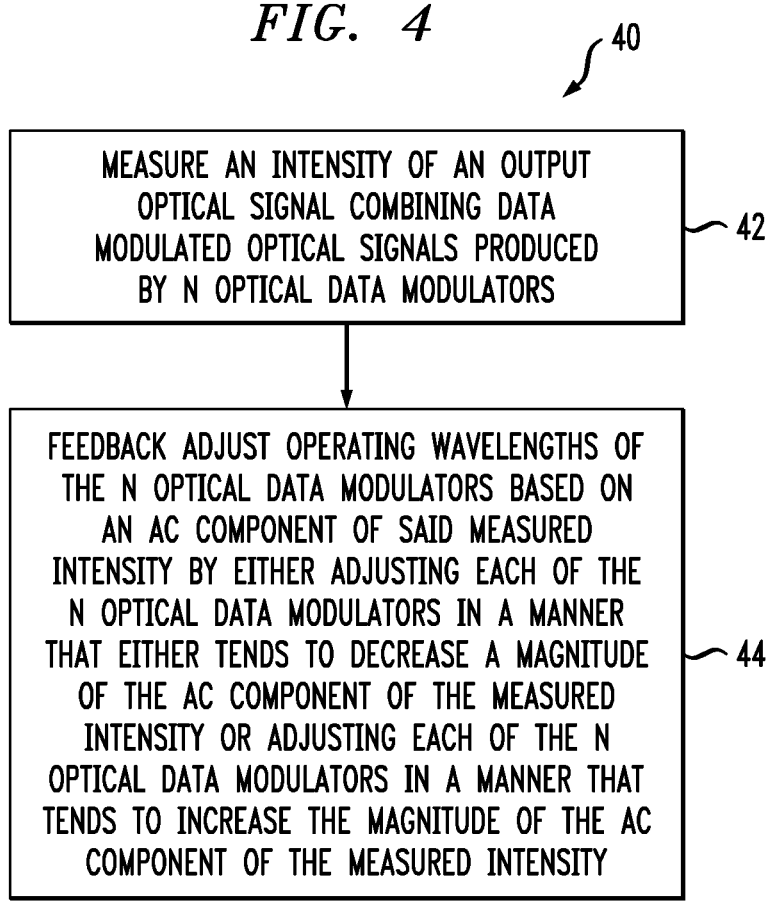
FIG. 4 is a flow chart illustrating a method of operating an array of optical data modulator, e.g., arrays of optical data modulators as illustrated in FIGS. 1-3.

FIG. 4 illustrates a method 40 of operating an array of optical data modulators to output data-modulated optical carriers on multiple wavelength channels, e.g., the array devices 10, 10' of FIGS. 1-3.

The method 40 includes measuring an intensity of an output optical signal combining data-modulated optical signals produced by N optical data modulators (step 42).

The method also includes feedback adjusting operating wavelengths of the N optical data modulators based on an alternating current (AC) component of said measured intensity (step 44). The feedback adjusting step 44 involves either adjusting each of the N optical data modulators in a manner that tends to decrease a magnitude of the AC component of the measured intensity or adjusting each of the N optical data modulators in a manner that tends to increase the magnitude of the AC component of the measured intensity.

The step 44 may be performed using any method for optimizing the incoherent AC component of the combined output optical power at the optical output 22 of FIG. 1 over the set of operating wavelengths of the N optical data modulators 14_1, ... 14_N. In some embodiments, the optimization may cause the magnitude of the AC component to have a relatively low value, e.g., near to zero, for which the N optical data modulators 14_1, ... 14_N modulate, by substantially pure phase shift keying, the optical carriers in N substantially non-overlapping wavelength bands to carry independent digital data streams. For example, the N optical data modulators 14_1, ... 14_N may be N Mach-Zehnder interferometers, which are feedback controlled to modulate N different optical carrier wavelengths to carry N independent digital data streams in a binary phase shift keying format. In other embodiments, the optimization may cause the magnitude of the AC component to have a relatively high or maximal value, for which the N optical data modulators 14_1, ... 14_N amplitude modulate optical carriers in N substantially non-overlapping optical wavelength bands to carry independent digital data streams. For example, the N optical data modulators may be N optical resonators, e.g., optical loop resonators, or N MZIs, which are feedback controlled to amplitude modulate N different optical carrier wavelengths to carry the N independent digital data streams. The amplitude modulation may, e.g., have a format such as, ON/OFF keying, pulse amplitude modulation N (PAM N), discrete multi-tone modulation (DMT), or carrier-less amplitude phase modulation.

In some embodiments, the method 40 is performed in both an initialization stage and a stabilization stage. The initialization stage involves initially setting the operating wavelengths of a set of N optical modulators by measuring an AC component of the intensity of a combined optical signal output by the set as in step 42. In the initialization stage, the method 40 may include adjusting operating parameters of two or more of the optical modulators in a manner such that the adjusting of each of the two or more of the optical modulators reduces the AC component of the intensity of the combined output optical signal or such that the adjusting of each of the two or more of the optical modulators increases the AC component of the intensity of the combined output optical signal as in above step 44. In the initialization stage, the adjusting of the operating parameters of the different optical modulators may be performed sequentially so that different ones of the optical data modulators are initially set up to have different operating wavelengths.

In various embodiments, the step 44 of the method 40 may be use various processes to approximately optimize the magnitude of the AC component of the intensity of the combined output optical signal to have either a relatively high level, e.g., close to maximal, or to have a relatively low value, e.g., close to zero, as the N different operating wavelengths of the N optical data modulators are varied.

One simple optimization process is a gradient-ascent method. In such a process, during initialization, the N optical data modulators 14_1, . . . 14_N of FIG. 1 may be consecutively tuned to generate a substantial gradient in the AC component of the intensity of the combined optical signal at the optical output 22 of FIG. 1. Then, a conventional gradient-ascent method may be used to converge said starting operating configuration to an approximately maximum or minimum of AC component of the intensity of the combined output optical signal, i.e., an approximate maximum for an amplitude keying type of optical modulation and an approximate minimum for BPSK optical modulation. After initialization, the gradient-ascent method may be regularly repeated for the operating configuration of some or all the N optical data modulators 14_1, . . . 14_N to ensure stabilization of the operating wavelengths with any temperature drift.

For amplitude modulation, the initial adjustment of other optical data modulators 14_1, . . . 14_N to optimal operating wavelengths, after tuning one or more of the optical data modulators 14_1, . . . 14_N to an optimal operating wavelength should not typically detune the earlier tuned one or more of the optical data modulators 14_1, . . . 14_N. In particular, the intensity of the combined output optical power has an AC component that typically decreases when another of the optical modulators 14_1, . . . 14_N is gradually tuned towards the same operating wavelength as one of the early tuned optical data modulators 14_1, . . . 14_N.

The method 40 may be performed under the control of a digital data processor executing a program that includes the steps 42 and 44. Such a program may be stored in machine executable form on a digital data storage device such as an electronic memory, an electronic hard drive, or an optical disk.

Figure 5:
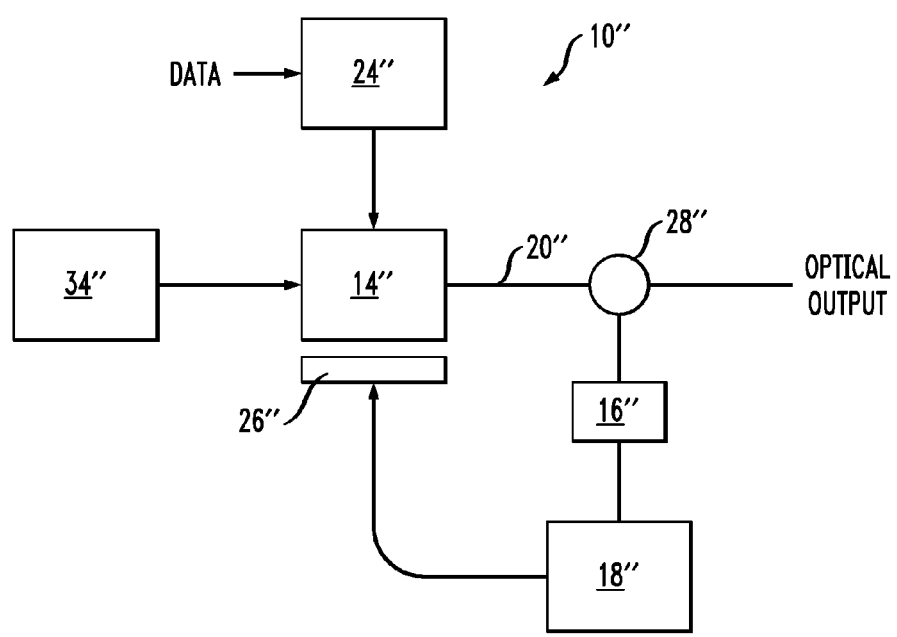
FIG. 5 schematically illustrates an optical data modulator for a single wavelength channel that is feedback controlled based on the AC component of the intensity of the data-modulated optical signal therefrom.

FIG. 5 schematically illustrates an apparatus 10" for data-modulating a single optical wavelength channel under feedback control that is based on the AC component of the intensity of the data-modulated optical signal produced at the optical output 20". The apparatus 10" includes an optical data modulator 14", an electrical tuner 26", a photo-sensitive diode or photo-sensitive transistor 16", and an electronic feedback controller 18".

The optical data modulator 14" is configured to receive an optical carrier from an optical source 34", e.g., a continuous wave laser, and to data-modulate a single wavelength channel thereof based on a digital data stream DATA received at an electronic driver 24". For example, the optical data modulator 14" may be any conventional optical component for producing rapid optical modulation, e.g., an optical resonator, such as an optical loop resonator, or a Mach-Zehnder interferometer (MZI).

The electronic driver 24" may be any conventional electronic driver for operating an optical modulator, e.g., an electronic controller of a high-speed optical phase shifter.

The electrical tuner 26" is located near or on a portion of the optical data modulator 14" in order to provide control of the operating wavelength of the optical data modulator 14". For example, the electrical tuner 14" may be a resistive heater located next to an optical waveguide segment of the optical data modulator 14". Such a resistive heater can control the effective optical refractive index of the nearby optical waveguide segment thereby setting the operating optical wavelength of the optical data modulator 14" itself. Alternately, the electrical tuner 14" may include a pair of electrodes located to apply a voltage across a PN- or PIN-semiconductor junction in an optical waveguide segment in the optical data modulator 14". Then, the electrodes may control the effective optical refractive index of the optical waveguide segment including the junction thereby controlling the operating wavelength of the optical data modulator 14" itself. Such control of an optical path length of an optical waveguide segment in a conventional optical loop resonator or MZI may be used in some embodiments of the electrical tuner 26", as has already been explained with respect to FIGS. 1-3.

The photo-sensitive diode or photo-sensitive transistor 16" is connected to receive light from the optical output 20" of the optical data modulator 14", e.g., via a conventional symmetric or asymmetric 1×2 optical coupler 28", and is configured to output a time-varying electrical signal representative of the measured time-varying intensity of said received light.

The electronic feedback controller 18" is connected to receive the electrical signal from the optical intensity detector 16" and is configured to operate said electrical tuner 26" based on an AC component of said electrical signal representative of said measured intensity. The electronic feedback controller 18" may be configured to produce the AC component by filtering the received electrical signal to remove low frequency and direct current components therein, e.g., via processing in a digital or analog high-pass or band-pass filter.

The optical data modulator 14" is configurable, by the electrical tuner 26", to data-modulate a selected single, optical carrier wavelength. If the optical data modulator 14" is an optical resonator or MZI, said optical component may be configured, by the optical controller 18", such that a magnitude of the AC component of the optical intensity, as measured by the photo-sensitive diode or photo-sensitive transistor 16", is maintained at a relatively high level. Then, the optical data modulator 14" can provide a high depth, amplitude modulation of the optical carrier, i.e., at the operating optical wavelength. Such an AC-monitoring-based feedback control of the optical data modulator 14" can improve the signal to noise ratio for amplitude modulation formats such as, ON/OFF keying, pulse amplitude modulation N (PAM N), discrete multi-tone modulation (DMT), or carrier-less amplitude phase modulation. Here, N=2, 3, 4, 4, 6, etc. Alternately, If the optical data modulator 14" is an MZI, the MZI may be configured, by the optical controller 18", such that a magnitude of the AC component of the optical intensity, as measured by the photo-sensitive diode or photo-sensitive transistor 16", is maintained at a relatively low level such that the optical data modulator 14" is operated as an optical phase modulator. For example, the relatively low level can be approximately zero for pure optical phase modulation. Thus, using an AC-component of the measured intensity of the data-modulated optical carrier may enable the electronic controller 18" to set and stabilize or lock the performance of the optical data modulator 14" at a more desirable operating point than would be typically available for an electronic controller that feedback controlled the optical data modulator 14" by monitoring the direct current (DC) component of the measured intensity of the data-modulated optical carrier produced thereby.

The Detailed Description of the Illustrative Embodiments and drawings merely illustrate principles of the inventions. Based on the present specification, those of ordinary skill in the relevant art will be able to devise various arrangements that, although not explicitly described or shown herein, embody the inventions and are included within the scope of the claims. Also, statements herein reciting principles, aspects, and embodiments are intended to encompass equivalents thereof.

What is claimed is:

1. An apparatus, comprising:
   an optical combiner having N optical inputs and having an optical output connected to combine light received at the N optical inputs;
   N optical data modulators, each of the optical data modulators being connected to transmit light to a corresponding one of the N optical inputs of the optical combiner;
   a plurality of electrical tuners, each electrical tuner being located to set an operating wavelength of a different one of the optical data modulators;
   an optical intensity detector being connected to receive light from the optical output of the optical combiner and being configured to output an electrical signal representative of a measured intensity of said received light; and
   an electronic feedback controller connected to receive the electrical signal from the optical intensity detector and to operate said electrical tuners based on an alternating current component of said measured intensity.

2. The apparatus of claim 1, wherein the plurality of electrical tuners includes less than N of said electrical tuners, each of the electrical tuners being located to control a corresponding one of the optical data modulators.

3. The apparatus of claim 1, wherein the plurality of electrical tuners includes N of said electrical tuners.

4. The apparatus of claim 1, wherein said electrical tuners are resistive heaters, each resistive heater being located to heat an optical waveguide segment of a corresponding one of the optical data modulators.

5. The apparatus of claim 4, wherein the electronic feedback controller is configured to operate the resistive heaters such that each optical data modulator operates at a different carrier wavelength than the other optical data modulators.

6. The apparatus of claim 1, wherein each optical data modulator is an optical resonator and the electronic feedback controller is configured to feedback operate the electrical tuners such that a magnitude of the alternating current component of the measured optical intensity is maintained at a relatively high level.

7. The apparatus of claim 1, wherein the electronic feedback controller is configured to feedback control the optical modulators such that a magnitude of the alternating current component of the measured optical intensity is maintained at a relatively low level.

8. The apparatus of claim 7, wherein the feedback controller is configured to cause the N optical data modulators to phase shift key modulate optical carriers at N different optical wavelengths.

9. The apparatus of claim 1, wherein the electronic feedback controller is configured to average said electrical signal over periods at least 100 times longer than an optical data symbol period for the optical data modulators.

10. The apparatus of claim 1, wherein each optical intensity detector is a photo-sensitive diode or a photo-sensitive transistor.

11. A method comprising:
    measuring an intensity of an output optical signal combining data modulated optical signals produced by N optical data modulators, each of the data modulated optical carriers having a different center wavelength;
    feedback adjusting operating wavelengths of the optical data modulators based on an alternating current component of said measured intensity; and
    wherein the feedback adjusting involves adjusting each of the N optical data modulators in a manner that tends to decrease a magnitude of an alternating current component of the measured intensity of the combined optical signal or involves adjusting each of the N optical data modulators in a manner that tends to increase the magnitude of the alternating current component of the measured intensity of the combined optical signal.

12. The method of claim 11, wherein the feedback adjusting involves adjusting an optical waveguide segment of each of the optical data modulators in a manner that tends to decrease the magnitude of the alternating current component and causes the optical data modulators to operate as optical phase shift keying modulators.

13. The method of claim 12, wherein the optical data modulators are Mach-Zehnder interferometers and the feedback adjusting causes said Mach-Zehnder interferometers to modulate different optical wavelengths to carry data in a phase shift keying format.

14. The method of claim 11, wherein the feedback adjusting involves the operating each of the N optical modulators in a manner that tends to increase the magnitude of the alternating current component and the feedback adjusting causes the N optical modulators to operate as optical amplitude modulators at different optical wavelengths.

15. The method of claim 14, wherein the optical data modulators are resonant optical cavities and the feedback adjusting causes said resonant optical cavities to modulate the different optical wavelengths to carry data in an amplitude keying format.

16. The method of claim 11, wherein the feedback adjusting includes time-averaging said measured intensity over a period at least 100 time longer than a data symbol period for the optical data modulators.

17. An apparatus, comprising:
    an optical data modulator;
    an electrical tuner located to control an operating wavelength of the optical data modulator;
    a photo-diode or photo-transistor being connected to receive light from an optical output of the optical data modulator and being configured to output an electrical signal representative of a measured intensity of said received light; and
    an electronic feedback controller connected to receive the electrical signal from the optical intensity detector and to operate said electrical tuner based on an alternating current component of said measured intensity.

18. The apparatus of claim 17, wherein the electronic feedback controller is configured to produce the alternating current component by filtering the received electrical signal to remove low frequency and direct current portions therein.

19. The apparatus of claim 18, wherein said electrical tuner is a resistive heater located to heat an optical waveguide segment of the optical data modulator.

20. The apparatus of claim 18, wherein the optical data modulator is an optical resonator and the electronic feedback controller is configured to feedback operate the electrical tuner such that a magnitude of the alternating current component of the measured optical intensity is maintained at a relatively high level.

21. The apparatus of claim 18, wherein the electronic feedback controller is configured to feedback control the optical data modulator such that a magnitude of the alternating current component of the measured optical intensity is maintained at a relatively low level such that the optical data modulator is operated as an optical phase modulator.

22. The apparatus of claim 18, wherein the electronic feedback controller is configured to average said electrical signal over periods at least 100 times longer than an optical data symbol period for the optical data modulator.

* * * * *